United States Patent
Summerfield

(10) Patent No.: US 10,693,509 B1
(45) Date of Patent: Jun. 23, 2020

(54) DIGITAL PREDISTORTION WITH POWER-SPECIFIC CAPTURE SELECTION

(71) Applicant: Analog Devices International Unlimited Company, Limerick (IE)

(72) Inventor: Steve Summerfield, Brookline, MA (US)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 0 days.

(21) Appl. No.: 16/591,012

(22) Filed: Oct. 2, 2019

(51) Int. Cl.
*H04B 1/04* (2006.01)

(52) U.S. Cl.
CPC ... *H04B 1/0475* (2013.01); *H04B 2001/0425* (2013.01); *H04B 2001/0433* (2013.01)

(58) Field of Classification Search
CPC .......... H03F 1/3247; H04B 2001/0433; H04B 17/13; H04B 27/368; H04B 27/367
See application file for complete search history.

(56) References Cited

U.S. PATENT DOCUMENTS

| 8,023,588 B1 | 9/2011 | Benson et al. |
| 8,588,332 B2 | 11/2013 | Cai et al. |
| 9,287,833 B2 | 3/2016 | Peroulas et al. |
| 9,374,112 B2 | 6/2016 | Yang et al. |
| 9,735,741 B2 | 8/2017 | Pratt et al. |
| 10,063,265 B2 | 8/2018 | Pratt et al. |
| 2008/0157869 A1* | 7/2008 | Bhandari .............. H03F 1/3247 330/149 |

FOREIGN PATENT DOCUMENTS

| WO | 2010/056736 A2 | 5/2010 |
| WO | 2011/131122 A1 | 10/2011 |
| WO | 2019/132949 A1 | 7/2019 |

OTHER PUBLICATIONS

*Modeling RF Power Amplifiers and Increasing Transmitter Linearity with DPD Using MATLAB*, White Paper, MathWorks® © 2018, 31 pages.

* cited by examiner

Primary Examiner — Kevin Kim
(74) Attorney, Agent, or Firm — Patent Capital Group

(57) ABSTRACT

Digital predistortion methods with power-specific capture selection are disclosed. An example method includes receiving a feedback signal indicative of a power amplifier output and establishing boundaries of multiple ranges of powers in the received signal by analyzing signal statistics in windowed intervals of multiple trial captures. At least one range established in this manner may include the highest value, and at least one other range may include the lowest value of the maximum powers determined for the trial captures. The method further includes updating a power amplifier model based on one or more captures of the feedback signal in each of the K ranges, and using the model to apply digital predistortion to an input signal. By specifically targeting regions of lower power and combining these with high-power captures, the model can be made more representative of the signal as a whole, and signal quality may be improved.

25 Claims, 7 Drawing Sheets

DIGITAL PREDISTORTION WITH POWER-SPECIFIC CAPTURE SELECTION

TECHNICAL FIELD OF THE DISCLOSURE

The present disclosure generally relates to electronics, and, more specifically, to predistorting input to circuits with nonlinear responses.

BACKGROUND

Both, systems used for wireless communication such as Long Term Evolution (LTE) and $5^{th}$ generation (5G), and systems used for cable communication such as cable television networks, are radio systems in that they transmit and receive signals in the form of electromagnetic waves in the radio frequency (RF) range of approximately 3 kiloHertz (kHz) to 300 gigaHertz (GHz). In both of these types of systems a power amplifier that is used to amplify RF signals prior to transmission is a crucial component.

Power amplifiers can generate amplified RF signals that include nonlinear distortions. The response of power amplifiers with nonlinear distortions can result in reduced modulation accuracy (e.g., reduced error vector magnitude (EVM)) and/or out of band emissions. Accordingly, communication systems have stringent specifications on power amplifier linearity.

Digital predistortion (DPD) can be applied to enhance linearity of a power amplifier. Typically, DPD involves applying, in the digital domain, predistortion to a signal to be provided as an input to a power amplifier to reduce and/or cancel distortion that is expected to be caused by the power amplifier. The predistortion can be characterized by a power amplifier model. The power amplifier model can be updated based on the feedback from the power amplifier (i.e., based on the output of the power amplifier). The more accurate a power amplifier model is in terms of predicting the distortions that the power amplifier will introduce, the more effective the predistortion of an input to the power amplifier will be in terms of reducing the effects of the distortion caused by the amplifier.

Obtaining an accurate power amplifier model that may be used to perform DPD is not trivial and further improvements would be desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

For purposes of illustrating DPD techniques proposed herein, it might be useful to first understand phenomena that may come into play in communication systems. The following foundational information may be viewed as a basis from which the present disclosure may be properly explained. Such information is offered for purposes of explanation only and, accordingly, should not be construed in any way to limit the broad scope of the present disclosure and its potential applications.

Solid-state devices that can be used in high frequency are of great importance in modern semiconductor technologies. Due, in part, to their large band gap and high mobility, III-N based transistors (i.e., transistors that employ compound semiconductor materials with a first sub-lattice of at least one element from group III of the periodic table (e.g., Al, Ga, In) and a second sub-lattice of nitrogen (N) as channel materials), such as gallium nitride (GaN) based transistors, may be particularly advantageous for high frequency applications. In particular, power amplifiers may be built using GaN transistors.

While GaN transistor have desirable features in terms of cut-off frequency and efficiency, their behavior is complicated by an effect known at charge trapping, where defect sites in the transistor channel trap charge carriers. The density of trapped charges is largely dependent on the gate voltage, where the gate voltage is typically proportional to the signal amplitude. To complicate things further, an opposite effect may simultaneously compete with the effect of charge trapping. Namely, as some charge carriers are trapped by defect sites, other charge carriers are released from the traps, e.g., due to thermal activation. These two effects have very different time constants: the defect sites may be filled with trapped charges quickly any time the gate voltage is increased, while the release of trapped charges happens more slowly. The release time constants can be 10's of microseconds and up to milliseconds, with the effect typically being very visible on the time scale of the symbol periods in 4G or 5G data, especially for data that contains bursts.

Figure 1:
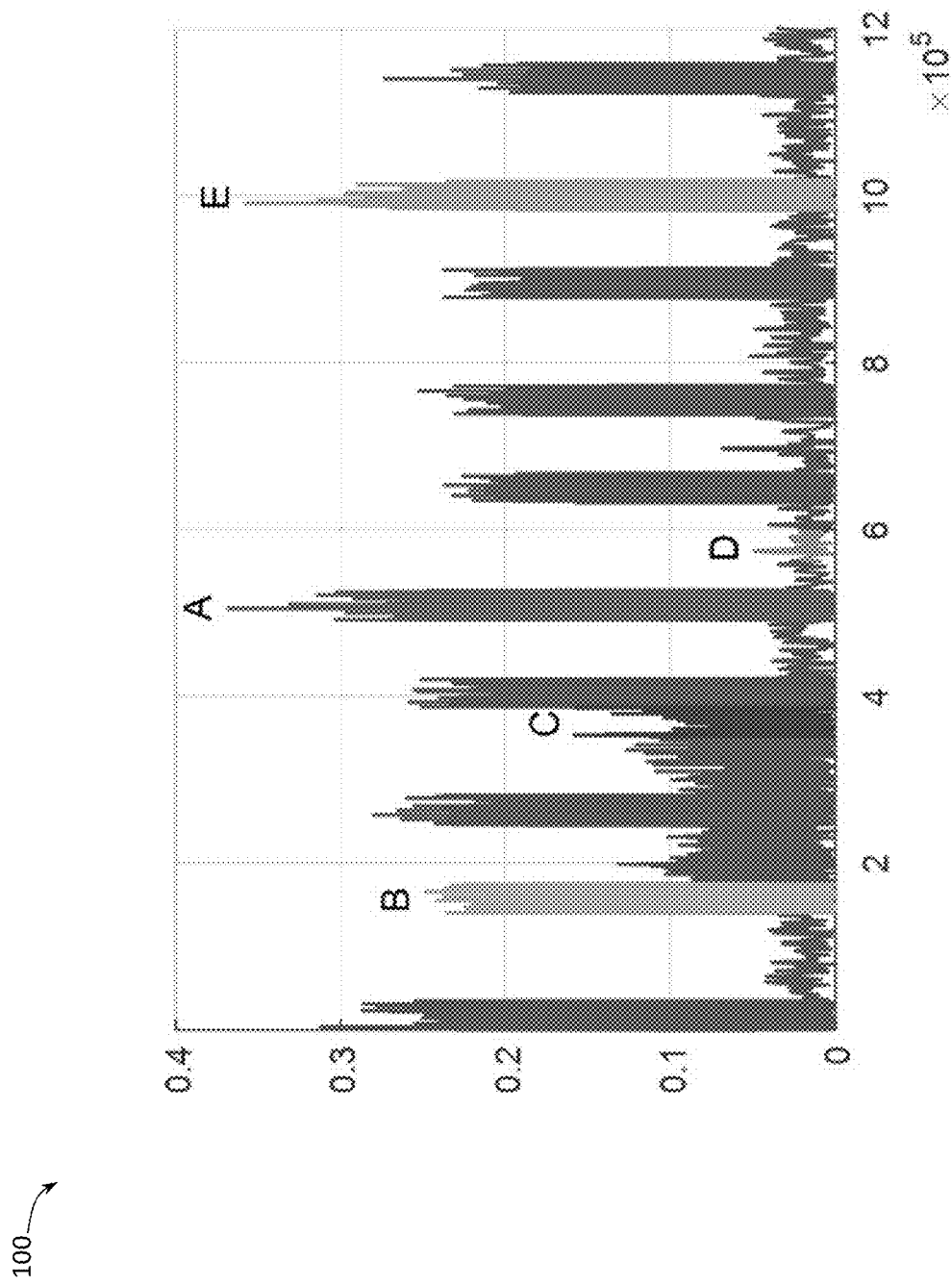
FIG. 1 illustrates data bursts in an example signal.
Figure 2:
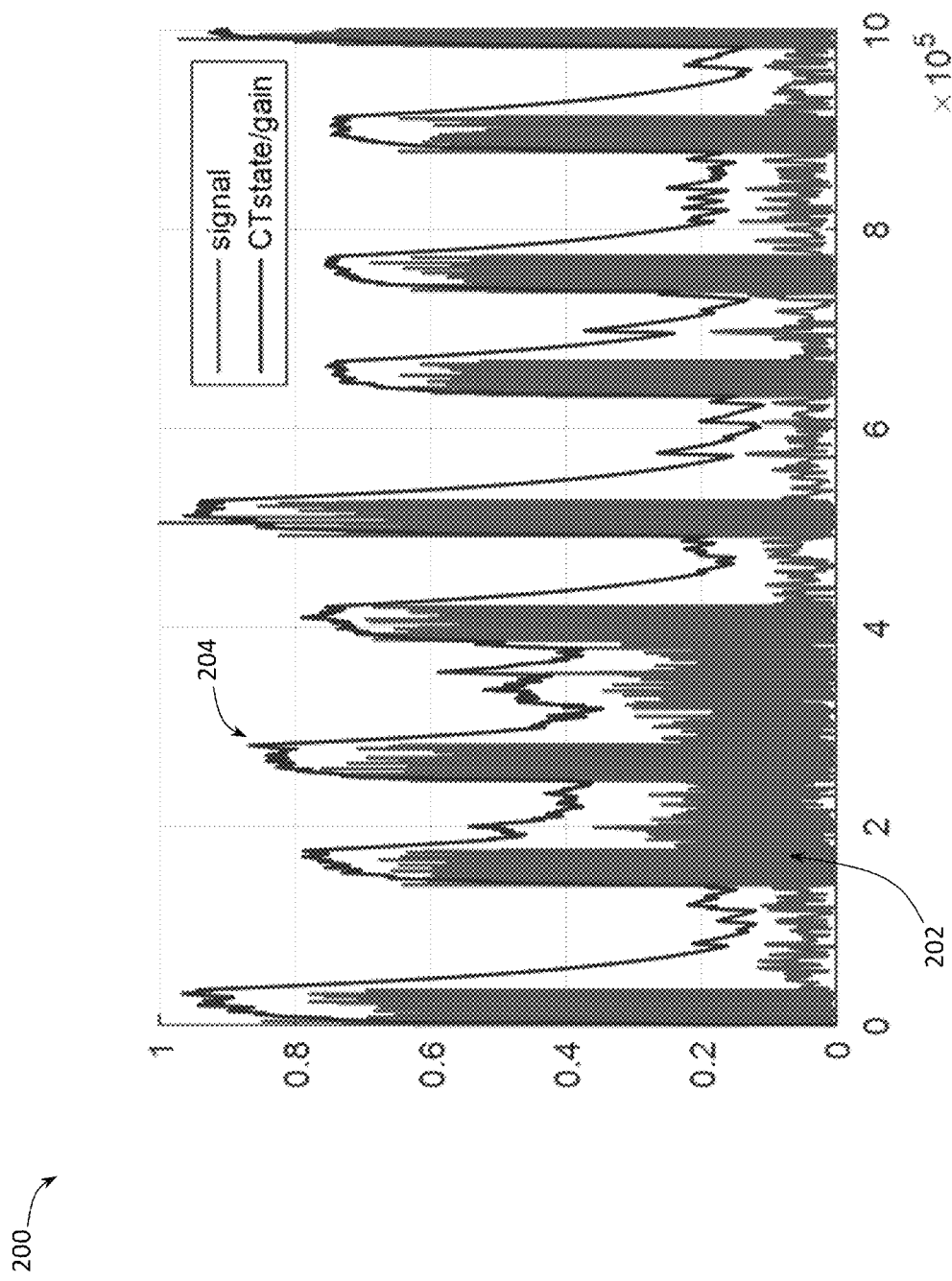
FIG. 2 illustrates how charge trapping can affect the gain in an example signal.
Figure 3:
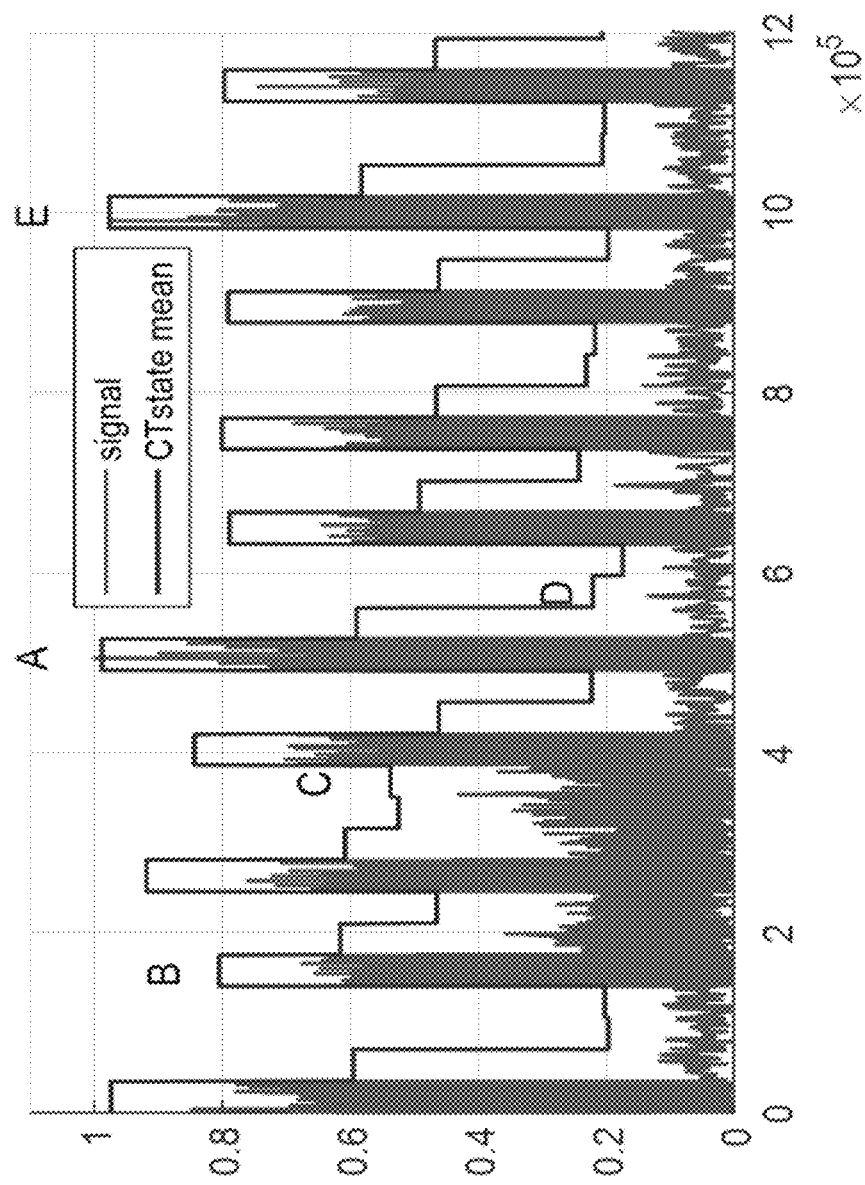
FIG. 3 illustrates an example signal and a CT model with the mean gain in each symbol period.

FIG. 1 provides an illustration 100, showing an example signal with data bursts. The horizontal axis of FIG. 1 indicates data samples of the signal, while the vertical axis indicates the signal amplitude. Letters A, B, C, D, and E, shown in FIG. 1, label peaks in various portions of the signal. FIG. 2 provides an illustration 200, showing an example signal with data bursts similar to that shown in FIG. 1, but now also illustrating how charge trapping can affect the gain in the signal. In particular, FIG. 2 shows an amplitude plot of a 4G standard test signal, labeled in FIG. 2 as a signal 202, known at ETM2 in the 3GPP standards. A curve 204, shown in FIG. 2 as an overlay over the amplitude plot of the signal 202, illustrates a typical expected behavior for the charge trap (CT) density/state. FIG. 2 illustrates that the CT state (i.e., the curve 204) rises rapidly every time there is a power burst (i.e., every time there is a burst in the signal 202 where the amplitude of the signal 202 sharply increases) and then decays slowly in the regions where the signal 202 is of relatively low power. The charge in the traps acts to oppose the effect of the applied gate voltage to the transistor channel and is, thus, manifested macroscopically as a modulation of the gain of the transistor. FIG. 3 illustrates an example signal and a CT model with the mean gain in each symbol period. As can be seen from FIG. 3, the mean gain varies in different portions of the signal. It is this dynamic gain change that affects the signal quality in GaN power amplifiers.

The signal quality is the measure of how closely the amplifier is linear, i.e., of how closely the signal that is transmitted from the output of the power amplifier matches the signal that is provided to the input of the power amplifier. The signal 202 shown in FIG. 2 may be seen as an illustration of a signal provided to the input of the power amplifier, while the signal 204 shown in FIG. 2 provides an illustration of how a signal at the output of the power amplifier would change, compared to the input signal, because of the effects within the power amplifier. FIG. 2 illustrates that the relatively fast charge trapping and the relatively slow charge release in a GaN power amplifier may distort the input signal to the power amplifier in a nonlinear manner, resulting in a distorted signal at the output of the amplifier.

As described above, DPD can pre-distort an input to a power amplifier to reduce and/or cancel distortion caused by the amplifier. To that end, at a high level, DPD involves forming a model of how a power amplifier may affect an input signal, the model defining coefficients of a filter, or gain, to be applied to the input signal in an attempt to reduce and/or cancel the distortion of the input signal caused by the amplifier. In this manner, DPD will try to compensate for a nonlinear gain of the amplifier, by applying a corresponding gain to the input signal, where typically one gain is applied at any one signal amplitude.

The model used in DPD algorithms is an adaptive model, meaning that it is formed in an iterative process by gradually adjusting the coefficients based on the comparison between the data that comes in to the input to the amplifier and the data that comes out from the output of the amplifier. Estimation of DPD coefficients is based on captures of a finite sequence of input and output data (i.e., input to and output from a power amplifier). In conventional DPD algorithms, captures centered only on high-power data portions are used. This means that, for a signal as shown in FIG. 1, data captures centered on peaks in regions A and E would be selected. With such an approach, the gain at any given signal amplitude will be the average of the gains seen in the regions A and E. Inventor of the present disclosure realized that the gain that is the average of the gains seen in the high-power regions of a signal may be radically different from the gains in the low-power regions, which may be especially pronounced for bursty signals. Therefore, with conventional DPD algorithms that focus on captures only in high-power regions, the signal error may be very high in the regions of lower power and, hence, the overall signal quality may be significantly impaired.

One aspect of the present disclosure provides computer-implemented (i.e., electronically-implemented) methods of digital predistortion with power-specific capture selection. An example method includes receiving, by a receiver of a communication system, a feedback signal indicative of (e.g., including, or being based on) an output of a power amplifier and establishing boundaries of K ranges of powers in the received signal. The boundaries may be established by analyzing signal statistics in windowed intervals of N trial captures. For example, the boundaries may be established by acquiring N trial captures of samples of the feedback signal (where each trial capture includes L consecutive samples of the feedback signal, and where each of K, N, and L is an integer equal to or greater than 2), determining, for each of the N trial captures, a measure indicative of the maximum power, and establishing the boundaries for each of the K ranges based on the highest measure of the maximum powers among all of the N trial captures. At least one of the K ranges may include the highest value of the maximum powers determined for the N trial captures, and at least one other one of the K ranges may include the lowest value of the maximum powers determined for the N trial captures. The method also includes updating a power amplifier model based on one or more captures of the feedback signal in each of the K ranges, and using the model to apply digital predistortion to an input signal. Such a method allows realizing DPD with power-specific capture selection, where captures of different power ranges are represented in a power amplifier model, as opposed to only using captures in high-power ranges, as it done in conventional DPD algorithms described above. By specifically targeting captures in regions of lower peak power and combining these captures with high-power captures, the DPD estimation can be made more representative, on average, of the signal as a whole, and the in-band EVM signal quality may be improved. Establishing, or formulating, the target power ranges which, together, represent the full range of magnitudes of a signal being transmitted, and applying these power ranges to capture selection, advantageously makes the method dynamic and adaptive to various input signals.

While some of the descriptions are provided herein with reference to GaN based power amplifiers, in general, various embodiments of the methods of digital predistortion with power-specific capture selection presented herein are applicable to power amplifiers which are not GaN based, as well as to any nonlinear electronic components (i.e., components that may exhibit nonlinear behavior) other than power amplifiers.

As will be appreciated by one skilled in the art, aspects of the present disclosure, in particular aspects of DPD with power-specific capture selection as described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of any methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing RF transmitters, receivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Various aspects of the illustrative embodiments are described using terms commonly employed by those skilled in the art to convey the substance of their work to others skilled in the art. The terms "substantially," "approximately," "about," etc., may be used to generally refer to being within +/−20% of a target value based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A, B, and/or C).

Example Communication System with DPD Based on Power-Specific Capture Selection

As summarized above, embodiments of the present disclosure relate to performing DPD with power-specific capture selection. To that end, a system as shown in FIG. 4 may be used.

Figure 4:
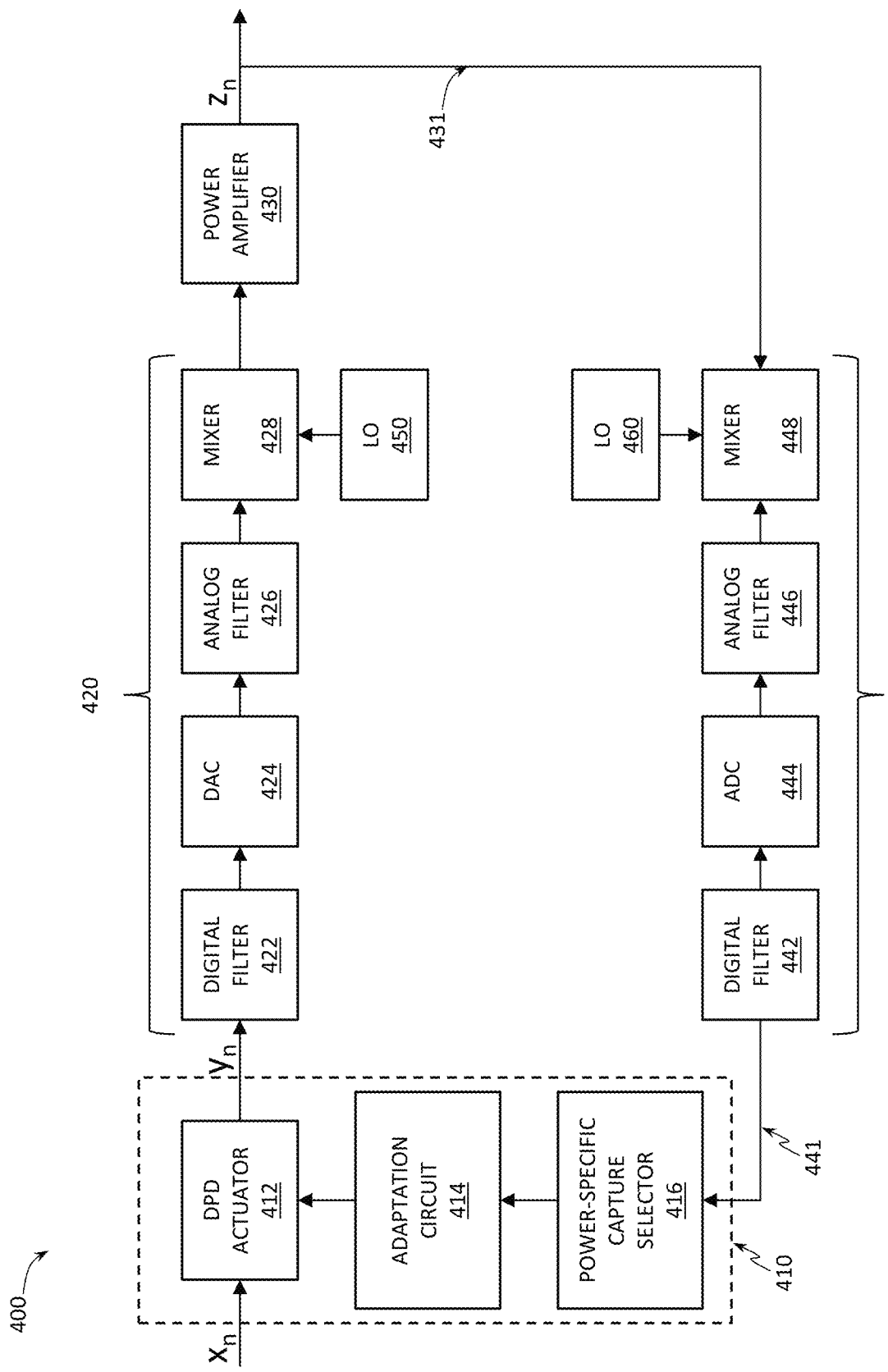
FIG. 4 illustrates a schematic block diagram of a communication system with a DPD circuit configured to implement power-specific capture selection, according to some embodiments of the present disclosure.

FIG. 4 illustrates a schematic block diagram of a communication system 400 with a DPD circuit 410 configured to implement power-specific capture selection, according to some embodiments of the present disclosure. FIG. 4 illustrates that the communication system 400 may include a transmitter circuit (or, simply, a "transmitter") 420 in communication with the DPD circuit 410, and a power amplifier 430 in communication with the transmitter 420. The output from the power amplifier may be provided, as a feedback signal, to a receiver circuit (or, simply, a "receiver") 440 that is also in communication with the DPD circuit 410.

As shown in FIG. 4, the DPD circuit 410 may include a DPD actuator 412, an adaptation circuit 414, and a power-specific capture selector circuit 416. The receiver 420 may include a digital filter 422, a digital-to-analog converter (DAC) 424, an analog filter 426, and a mixer 428. The transmitter 440 may include a digital filter 442, an analog-to-digital converter (ADC) 444, an analog filter 446, and a mixer 448. In various embodiments, the communications system 400 can include fewer or more elements than those illustrated in FIG. 4.

As shown in FIG. 4, an input signal X (labeled in FIG. 4 as $x_n$, referring to a sequence of digital samples of the signal X) may be received by the DPD actuator 412. In some embodiments, the input signal X may include one or more active channels in the frequency domain. In some embodiments, the input signal X may be a baseband digital signal. The DPD actuator 412 may be configured to predistort the input signal X based on predistortion coefficients α provided by the DPD adaptation circuit 414. In turn, the DPD adaptation circuit 414 may be configured to generate the predistortion coefficients based on a model that uses power-specific capture selection defined by the power-specific capture selector 416, described in greater detail below. The DPD actuator 412 can provide the predistorted input Y (labeled in FIG. 4 as $y_n$, referring to a sequence of digital samples of the signal Y), which is the input signal X to which predistortion has been applied, to the transmitter 420. The DPD actuator 412 can be implemented by any suitable circuits. For instance, in some embodiments, the DPD actuator 412 can be implemented by combinational logic circuits.

The transmitter 420 may be configured to upconvert the predistorted input Y from a baseband signal to a higher frequency signal, such as an RF signal. In the illustrated transmitter 420, the predistorted input Y may be filtered in the digital domain by the digital filter 422 to generate a filtered predistorted input Y, a digital signal. The output of the digital filter 422 may then be converted to an analog signal by the DAC 424. The analog signal provided by the DAC 424 may then be filtered by an analog filter 426. The output of the analog filter 426 may then be upconverted to RF by the mixer 428, which may receive a signal from a local oscillator 450 to translate the filtered analog signal from the analog filter 426 from baseband to RF. Other methods of implementing the transmitter 420 are also possible and within the scope of the present disclosure. For instance, in another implementation (not illustrated) the output of the digital filter 422 can be directly converted to an RF signal by the DAC 424. In such an implementation, the RF signal provided by the DAC 424 can then be filtered by the analog filter 426. Since the DAC 424 would directly synthesize the RF signal in this implementation, the mixer 428 and the local oscillator 450 illustrated in FIG. 4 can be omitted from the system 400 in such embodiments.

As further illustrated in FIG. 4, the RF signal generated by the transmitter 420 is provided to the power amplifier 430. The power amplifier 430 amplifies the RF signal and provides an amplified RF signal Z (labeled in FIG. 4 as $z_n$, referring to a sequence of analog values of the signal Z). The amplified RF signal Z can be provided to an antenna (not illustrated in FIG. 4) to be wirelessly transmitted. The amplified RF signal Z has a signal bandwidth. The signal bandwidth can be a wide bandwidth. As one non-limiting example, the signal bandwidth can be about 1 GHz. The amplified RF signal Z is an amplified version of the input signal X. However, as discussed above, the amplified RF signal Z can have distortions outside of the main signal components. Such distortions can result from nonlinearities in the response of the power amplifier 430. As discussed above, it can be desirable to reduce such nonlinearities. Accordingly, feedback from the output of the power amplifier 430 can be provided to the DPD circuit 410 by way of the receiver 440. Then the DPD circuit 410 can cause the predistortion applied to the input signal X to be adjusted.

To provide feedback to the DPD circuit 410, a portion 431 of the amplified RF signal Z can be provided to the receiver 440. For example, in some embodiments, a feedback element (not illustrated) may be used in the signal path between the output of the power amplifier 430 and the receiver 440, e.g., a resistive element that feeds back a relatively small portion of the amplified RF signal to the receiver 440. In some other embodiments (also not illustrated), a directional coupler or other suitable circuit can provide a portion of the amplified RF signal ZT to the receiver 440. In some embodiments (not illustrated), a feedback filter may be provided in the signal path between the output of the power amplifier 430 and the receiver 440, e.g., to filter the feedback signal 431 and provide the filtered signal as a feedback signal to the receiver 440 for processing. The feedback signal 431 provided to the receiver 440 can have approximately the same bandwidth as the amplified RF signal Z.

In some embodiments, the receiver 440 is configured to perform diagnostics and/or equalization. Accordingly, the receiver 440 can be utilized for providing feedback to the DPD circuit 410 and for diagnostics and/or equalization in such embodiments. In the illustrated receiver 440, the feedback signal 431 may be downconverted to the baseband by the mixer 448, which may receive a signal from a local oscillator 460 (which may be the same or different from the local oscillator 450) to translate the feedback signal 431 from the RF to the baseband. The output of the mixer 448 may then be filtered by the analog filter 446. The output of the analog filter 446 may then be converted to a digital signal by the ADC 444. The digital signal generated by the ADC 424 may then be filtered in the digital domain by the digital filter 442 to generate a filtered downconverted feedback signal 431 which may be provided to the DPD circuit 410. Other methods of implementing the receiver 440 are also possible and within the scope of the present disclosure. For instance, in another implementation (not illustrated) the RF feedback signal 431 can be directly converted to a baseband signal by the ADC 444. In such an implementation, the downconverted signal provided by the ADC 444 can then be filtered by the digital filter 442. Since the ADC 444 would directly synthesize the baseband signal in this implementation, the mixer 448 and the local oscillator 460 illustrated in FIG. 4 can be omitted from the system 400 in such embodiments.

Further variations are possible to the system 400, described above. For example, while upconversion and downconversion is described with respect to the baseband frequency, in other embodiments of the system 400, an intermediate frequency (IF) may be used instead. IF may be used in superheterodyne radio receivers, in which a received RF signal is shifted to an IF, before the final detection of the information in the received signal is done. Conversion to an IF may be useful for several reasons. For example, when several stages of filters are used, they can all be set to a fixed frequency, which makes them easier to build and to tune. In some embodiments, the mixers of RF transmitter 420 or the receiver 440 may include several such stages of IF conversion. In another example, although a single path mixer is shown in each of the transmit (TX) path (i.e., the signal path for the signal to be processed by the transmitter 420) and the receive (RX) path (i.e., the signal path for the signal to be processed by the receiver 440) of FIG. 4, in some embodiments, the TX path mixer 428 and the RX path mixer 448 may be implemented as a quadrature upconverter and downconverter, respectively, in which case each of them would include a first mixer and a second mixer. For example, for the RX path mixer 448, the first RX path mixer may be configured for performing downconversion to generate an in-phase (I) downconverted RX signal by mixing the feedback signal 431 and an in-phase component of the local oscillator signal provided by the local oscillator 460. The second RX path mixer may be configured for performing downconversion to generate a quadrature (Q) downconverted RX signal by mixing the feedback signal 431 and a quadrature component of the local oscillator signal provided by the local oscillator 460 (the quadrature component is a component that is offset, in phase, from the in-phase component of the local oscillator signal by 90 degrees). The output of the first RX path mixer may be provided to a I-signal path, and the output of the second RX path mixer may be provided to a Q-signal path, which may be substantially 90 degrees out of phase with the I-signal path.

Example Method for Performing DPD with Power-Specific Capture Selection

Turning to the details of the DPD circuit 410, functionality of performing DPD with power-specific capture selection according to various embodiments of the present disclosure may be illustrated with reference to FIG. 5, providing a flow chart of a method 500 that may be implemented by the DPD circuit 410.

At least portions of the method 500 may be implemented by elements of a communication system according to any embodiments of the present disclosure, e.g., by the communication system described with reference to FIG. 4 and/or by one or more data processing systems, such as the data processing system 700 shown in FIG. 7. Although described with reference to system components of the systems shown in the present figures, any system, configured to perform operations of the method 500, in any order, is within the scope of the present disclosure. Furthermore, it should be noted that, while a differentiation is made, both in the illustration of the communication system 400 shown in FIG. 4 and the method 500 shown in FIG. 5, between the adaptation circuit 414 and the power-specific capture selector circuit 416, this differentiation may be only logical, to differentiate functions that may be performed by a conventional DPD circuit (described herein with reference to the adaptation circuit 414) and functions specifically related to power-specific capture selection (described herein with reference to the power-specific capture selector circuit 416). In various embodiments, functionality of the power-specific capture selector circuit 416 may be included, or be considered as a part of the adaptation circuit 414, or functionalities of these two circuits may be spread over a larger number of individual circuits.

The method 500 may begin with an operation 502 that includes the power-specific capture selector circuit 416 receiving a feedback signal from a nonlinear electronic component and acquiring N trial captures from the feedback signal. For example, the operation 502 may include receiving the feedback signal 431 from the power amplifier 450, generating a digital feedback signal 441 based on the signal provided by the power amplifier 450, and acquiring N trial captures from the feedback signal 441. These captures are referred to as "trial" to indicate that they are used to establish boundaries of K ranges of powers in the feedback signal that is indicative of the output of the power amplifier 450 and that these captures may or may not be used as captures based on which predistortion coefficients are computed later on. The signal output by the power amplifier 450 may be an unknown and dynamic signal, in which case the boundaries for different ranges of powers need to be established at the beginning of operation of the system 400, and/or repeated intermittently.

In some embodiments, each trial capture acquired in 502 may include L consecutive samples of the digital feedback signal, while, in other embodiments, different trial captures acquired in 502 may include different number of consecutive samples of the digital feedback signal. Each of K, N, and L may be an integer equal to or greater than 2. For example, in some embodiments, K may be an integer equal to or greater than 3, e.g., an integer equal to or greater than 4; in some embodiments, L may be an integer equal to or greater than 500, e.g., an integer equal to or greater than 1000, an integer equal to or greater than 2000, or an integer equal to or greater than 4000; and, in some embodiments, N may be an integer equal to or greater than 25, e.g., an integer equal to or greater than 50, an integer equal to or greater than 75, or an integer equal to or greater than 100. In some embodiments, L may be around ⅛th of a symbol period, e.g., L may be equal to 4096 at a sample rate of 491.52 Msps. In some embodiments, for each trial capture acquired in 502, the samples of the feedback signal in that capture are from a portion of the feedback signal that is different from portions of the feedback signal for other captures. In this manner, different portions of the feedback signal may be sampled so that a proper estimation of the total range of powers of the output of the power amplifier 450 may be established.

The method 500 may further include an operation 504, which includes the power-specific capture selector circuit 416 determining the maximum power for each of the N trial captures acquired in 502. In some embodiments, the power-specific capture selector circuit 416 may include an instantaneous power circuit configured to compute an instantaneous power of the acquired trial captures. Next, based on the computed instantaneous power, a peak location circuit of the power-specific capture selector circuit 416 may be configured to identify the highest peak in the instantaneous power signal for each of the trial captures. The instantaneous power of the highest peak of a given trial capture may then be labeled as the maximum power for the capture, and stored in memory (e.g., in memory described with reference to FIG. 7).

While the operations 502 and 504 may appear as two consecutive operations in the method 500, there are many variations possible to the order and repetition of these operations, which may, e.g., be dependent on the amount of the available storage and processing resources in the system implementing the method 500. For example, in some embodiments, only one buffer for storing L trial captures may be available. In such embodiments, the operation 502 is performed to acquire the first trial capture and store it in the buffer, then the operation 504 is performed to determine the maximum power of the first capture based on the content of the buffer, and the value of the determined maximum power for the first capture is stored. Next, the operation 502 is repeated to acquire the second trial capture and store it in the buffer, thereby replacing the values of the first trial capture, then the operation 504 is repeated to determine the maximum power of the second capture, and the value of the maximum power for the second capture is stored. This may be repeated until the maximum powers for all of the N trial captures have been recorded. Such re-use of the buffer may also be implemented when there are more than one buffer available, but the number of the available buffers is less than the number N of the trial captures to be analyzed. Of course, in some embodiments, there may be a designated buffer available for each of the N trial captures, in which case the samples of all of the trial captures may be stored (i.e., none of the captures have to be replaced).

Regardless of the number of buffers used, as a result of performing the operations 502 and 504 for N trial captures, N values of the maximum power are obtained, with one value for each of the trial captures. Obtaining a plurality of trial captures, e.g., 100 trial captures, is aimed to provide a realistic representation of the total range of powers present in a signal. For example, the N trial captures may include relatively high-power captures such as captures A and E shown in FIG. 1, mid-power captures such as captures B and C shown in FIG. 1, and low-power captures such as captures D shown in FIG. 1. The method 500 may then proceed to an operation 506, where includes the power-specific capture selector circuit 416 may establish the boundaries for K ranges of powers for the output of the power amplifier 450 based on the values of the maximum power for the N trial captures.

Figure 6:
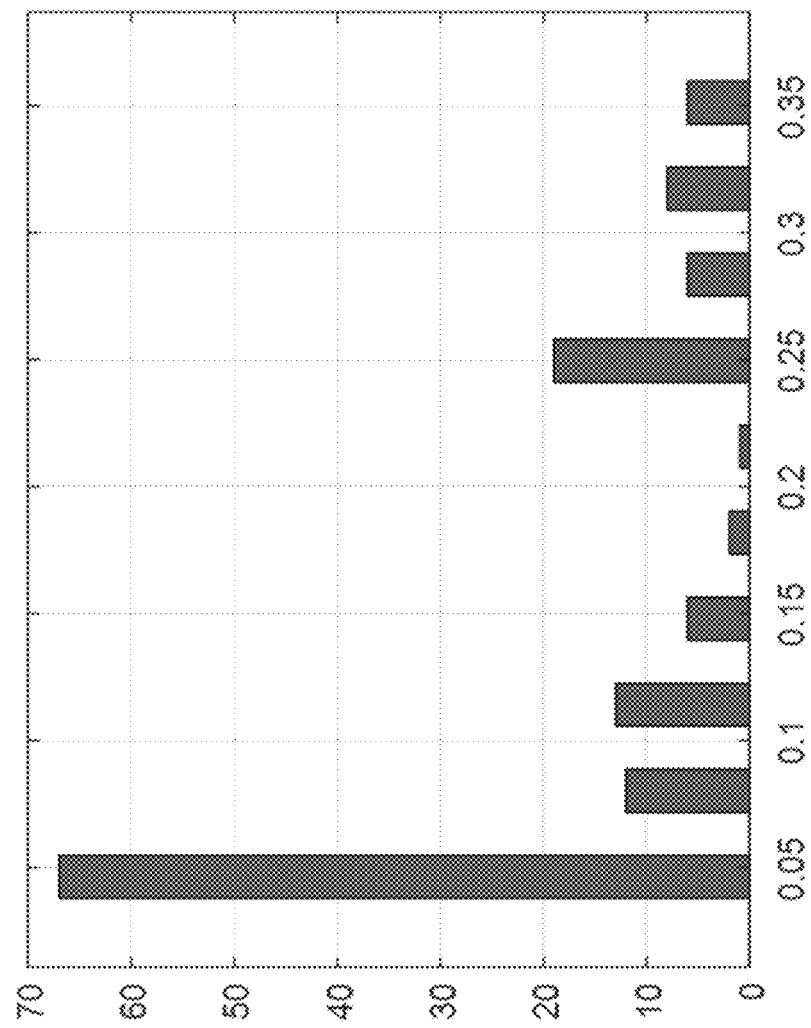
FIG. 6 illustrates symbol peak power statistics of an example signal, according to some embodiments of the present disclosure.

In some embodiments, the operation 506 may include establishing the boundaries of the K ranges of powers based on the highest and the lowest values of the maximum powers determined for the N trial captures. For example, the boundaries may be established such that one of the K ranges includes the highest value of the maximum powers determined for the N trial captures, and one of the K ranges includes the lowest value of the maximum powers determined for the N trial captures. If K is greater than 2, then the remaining ranges may be established in various manners between these two ranges. For example, in some embodiments, the remaining K−2 ranges of powers may be distributed uniformly between the one of the K ranges that includes the lowest value of the maximum powers determined for the N trial captures and the one of the K ranges that includes the highest value of the maximum powers determined for the N trial captures. In other embodiments, the remaining K−2 ranges of powers, or all K ranges of powers may be distributed in some fashion that is not necessarily linear. For example, in some embodiments, the boundaries of the K ranges of powers may be established based on a histogram of the maximum powers determined for the N trial captures. An example of such a histogram is shown in FIG. 6, illustrating on the horizontal axis values indicative of ranges of the maximum power for the N trial captures determined in 504, and illustrating on the vertical axis values indicative of the number of the trial captures having the maximum power that falls within a given range.

Further variations to establishing the boundaries for the K ranges are possible. In some embodiments, K may be an integer equal to or greater than 3, and at least one of the K ranges, different from the one of the K ranges that includes the highest value of the maximum powers determined for the N trial captures and different from the one of the K ranges that includes the lowest value of the maximum powers determined for the N trial captures, may include a power that is between 25 and 75 percent of the highest value of the maximum powers determined for all of the N trial captures. In some embodiments, the boundaries may be established such that one of the K ranges includes the highest value of the maximum powers determined for the N trial captures, and all of the remaining N−1 captures may be assigned to the second power range, representing the relatively low-power bin. In some embodiments, the boundaries may be established such that one of the K ranges includes the highest value of the maximum powers determined for the N trial captures, and the remaining K−1 ranges of powers are distributed uniformly between zero and the range that includes the highest value of the maximum powers.

Once the boundaries for K ranges of powers have been established, the method 500 may proceed with an operation 508 that includes the adaptation circuit 414 updating a model of the nonlinear electronic component based on one or more captures of the feedback signal in each of the K ranges. In some embodiments, at least some of the captures used for updating the model in 508 may be captures of the N trial captures which were used to establish the boundaries. In other embodiments, at least some of the captures used for updating the model in 508 may be additional captures acquired with the purpose of updating the model. In general, each non-trial capture may include M consecutive samples of the feedback signal, where M is an integer equal to or greater than 2. In some embodiments, M may be equal to L, making the implementation of the DPD circuit 410 simpler as all of the captures (i.e., both trial and non-trial captures) are of the same size, e.g., M=L=4000.

When new, i.e., non-trial captures are acquired to update the model in 508, it may be performed by acquiring non-trial captures at some intervals (again, to adequately sample the feedback signal) and values of the maximum power for the non-trial captures may be determined. The non-trial captures are then classified as to belong to one of the K ranges of powers based on their peak powers. In this manner, the desired number of captures in each of the K ranges may be obtained and these captures may be used for updating the model (the rest of the captures may be discarded). In some embodiments, the method 500 may also include (although not specifically shown in FIG. 5) an operation in which, for each range of the K ranges, a number of the one or more captures to be used for this range for updating the model in 508. For example, the power-specific selector circuit 416 may be configured to determine the number for each of the K ranges based on the number of the N trial captures for which the maximum power is in that range.

In some embodiments, the model update of the operation 508 may include generating or updating a sub-model for each of the K ranges (which may be referred to as a "power range model" for a given range), based on the one or more captures in that range. The sub-models for different ones of the K ranges may then be aggregated into the overall model.

In some embodiments, an example DPD model may be a generalized memory polynomial $y_n = \square \square_{jk} \square c_{ijk} x_{n-i} P_k (|x_{n-j}|)$, where $P_k(x)$ is a polynomial basis function of order k. This belongs to a class of linear in coefficient models that can be symbolised by $y_n = \square c \square f \square (x_n)$. This defines a feature function $f \square$ such that $\square \square \square$ subsumes all indices or order and memory.

For a finite sequence of L data and a model with K feature we can define the L by K Feature matrix based on the data $x_n$:

$F_k = [f_0(x_n) f_1(x_n) \ldots$ $f_0(x_{n-1}) f_1(x_{n-1}) \ldots$ $\ldots$ $\ldots f_k(x_{L-1})]$.

In indirect estimation $F=F_z$ is calculated for finite capture sequences Y and Z and DPD estimation is based on forming $Q=F^H F$ and $U=F^H Y$ (Y and Z are aligned). The DPD coefficients C provided by the adaptation circuit 414 to the DPD actuator 412 are $Q^{-1} U$. Q and U can be formed by sums over the captured samples and this admits the possibility of accumulation of these matrices over non-contiguous sample sets.

In some embodiments, updating the model in the operation 508 may include building the Q and U matrices as described above from multiple captures that sample the full range of powers of the signal.

As a result of updating the model in 508, DPD coefficients may be updated and provided from the adaptation circuit 414 to the DPD actuator 412. The method 500 may then proceed with an operation 510 that includes applying, by the DPD actuator 412, a predistortion to at least a portion of the input signal X, and then providing the predistorted input signal Y to the power amplifier 450, where the predistortion is based on the model. The model formed in 508 and the DPD applied in 510 may be realized using any suitable conventional DPD algorithms, or portions thereof, but now using captures in various ones of the K power ranges as established in 502-506 that sample the full range of powers of the signal. The consequence of this is that the (single) estimated gain curve will now be a closer fit on average to the gain in each symbol period, compared to a curve calculated solely from the high-power symbols. In this manner, the DPD circuit 410 may pre-emptively correct, in the digital domain, for distortions due to the nonlinearity of the power amplifier 450 (which, essentially, shapes the input signal X before it gets to the power amplifier 450 to counteract the nonlinearity distortions the power amplifier 450 will produce). Since the nonlinear gain compression of the power amplifier 450 may vary over time and operating conditions the feedback loop from the power amplifier 450 to the receiver 440 and to the DPD circuit 410 can be used to monitor an output of the power amplifier 450 and adapt the model accordingly (i.e., to modify or vary the predistortion applied by the DPD actuator 412). In some embodiments, the boundaries of the K ranges of power may be re-evaluated (i.e., re-established) during operation of the communication system 400 at some desired points in time, e.g., periodically, or when the DPD circuit 410 is triggered to do so.

Example Data Processing System

Figure 7:
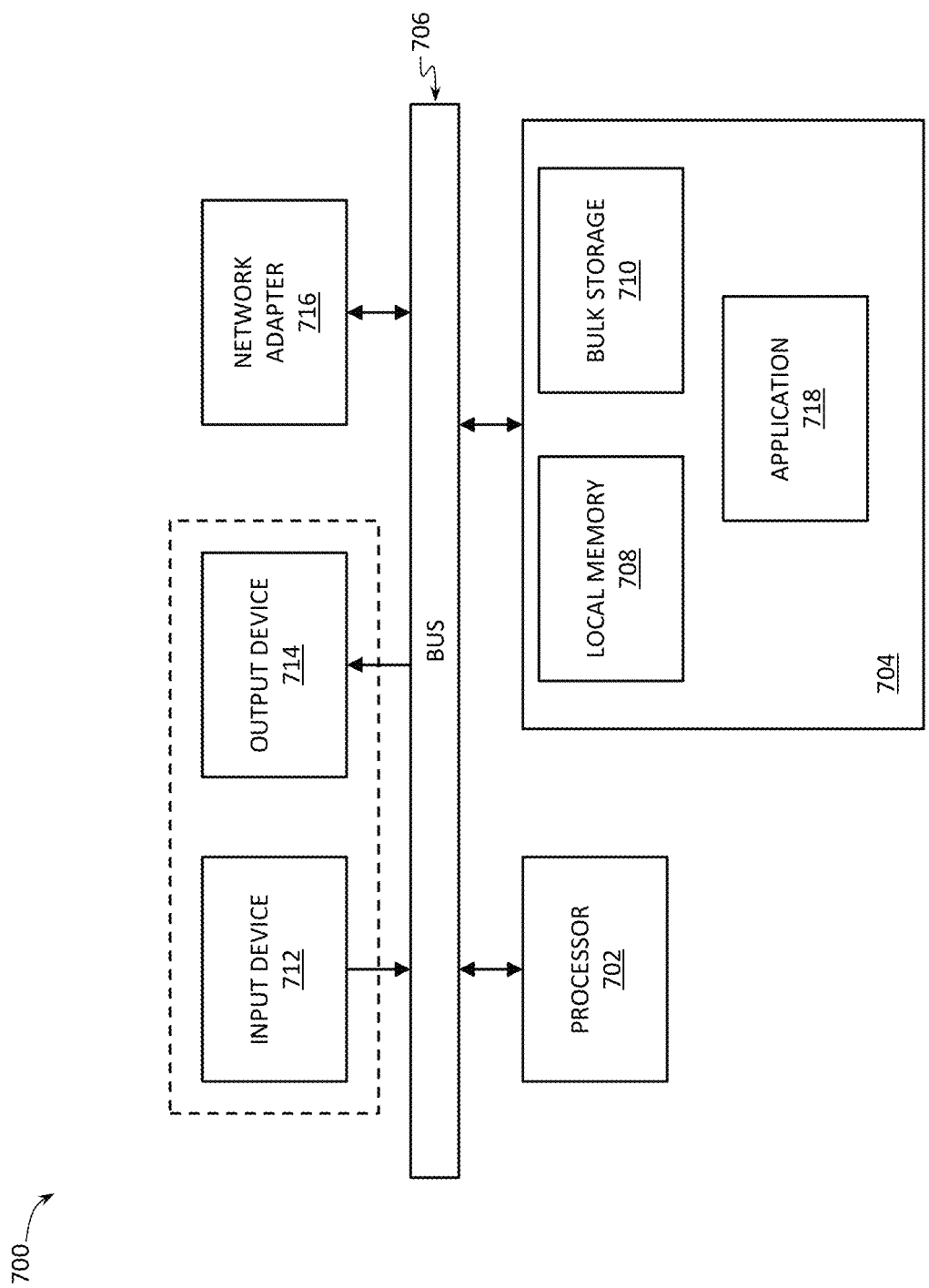
FIG. 7 provides a schematic block diagram of an example data processing system that may be configured to implement at least portions of DPD with power-specific capture selection, according to some embodiments of the present disclosure.

FIG. 7 provides a schematic block diagram of an example data processing system 700 that may be configured to implement at least portions of DPD with power-specific capture selection, according to some embodiments of the present disclosure. For example, the data processing system 700 may be used to implement at least portions of the communication system as described with reference to FIG. 4, in particular, to implement at least portions of the DPD circuit 410, shown in FIG. 4.

As shown in FIG. 7, the data processing system 700 may include at least one processor 702, e.g. a hardware processor 702, coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this disclosure.

In some embodiments, the processor 702 can execute software or an algorithm to perform the activities as discussed in this specification, in particular activities related to DPD with power-specific capture selection, such as various techniques implemented by the DPD circuit 410 described herein. The processor 702 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 702 may be communicatively coupled to the memory element 704, for example in a direct-memory access (DMA) configuration, so that the processor 702 may read from or write to the memory elements 704.

In general, the memory elements 704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIG. 4, can also include suitable interfaces for receiving, transmitting, and/or otherwise communicating data or information in a network environment so that they can communicate with, e.g., the data processing system 700 of another one of these elements.

In certain example implementations, mechanisms for implementing DPD with power-specific capture selection in communication systems as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 704 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 702 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

As shown in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 714 may be any type of screen display, such as plasma display, liquid crystal display (LCD), organic light emitting diode (OLED) display, electroluminescent (EL) display, or any other indicator, such as a dial, barometer, or light emitting diode (LED). In some implementations, the system may include a driver (not shown) for the output device 714. Input and/or output devices 712, 714 may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

SELECT EXAMPLES

Example 1 provides an apparatus for applying digital predistortion to an input signal. The apparatus includes a power-specific capture selector circuit configured to establishing boundaries of K ranges of powers in a feedback signal indicative of (e.g., including, or being based on) an output of a nonlinear electronic component by acquiring N trial captures of samples of the feedback signal, where each trial capture includes L consecutive samples of the feedback signal (each of K, N, and L may be an integer equal to or greater than 2), for each of the N captures, determining a maximum power, and establishing the boundaries of the K ranges of powers based on the maximum powers determined for the N trial captures, where one of the K ranges includes a highest value of the maximum powers determined for the N trial captures, and one of the K ranges includes a lowest value of the maximum powers determined for the N trial captures. The apparatus also includes an adaptation circuit configured to update a model of the nonlinear electronic component based on one or more captures of the feedback signal in each of the K ranges, where each of the one or more captures is either a capture of the N trial captures or a capture of a plurality of non-trial captures, where each non-trial capture includes M consecutive samples of the feedback signal, where M is an integer equal to or greater than 2. The apparatus further includes an actuator circuit configured to apply a predistortion to at least a portion of an input signal prior to providing the input signal to the nonlinear electronic component, where the predistortion is based on the model.

Example 2 provides the apparatus according to example 1, where K is an integer equal to or greater than 3, and at least one of the K ranges, different from the one of the K ranges that includes the highest value of the maximum powers determined for the N trial captures and different from the one of the K ranges that includes the lowest value of the maximum powers determined for the N trial captures, includes a power that is between 25 and 75 percent of the highest value of the maximum powers determined for the N trial captures.

Example 3 provides the apparatus according to examples 1 or 2, where the boundaries of the K ranges of powers are established further based on a histogram of the maximum powers determined for the N trial captures.

Example 4 provides the apparatus according to any one of examples 1-3, where the K ranges of powers are distributed nonlinearly.

Example 5 provides the apparatus according to any one of examples 1-3, where K−2 ranges of powers are distributed uniformly between the one of the K ranges that includes the lowest value of the maximum powers determined for the N trial captures and the one of the K ranges that includes the highest value of the maximum powers determined for the N trial captures.

Example 6 provides the apparatus according to any one of examples 1-3, where K−1 ranges of powers are distributed uniformly between zero and the one of the K ranges that includes the highest value of the maximum powers determined for the N trial captures.

Example 7 provides the apparatus according to any one of the preceding examples, where the power-specific capture selector circuit is further configured to, for each range of the K ranges, determine a number of the one or more captures to be used for the range for updating the model, where the number is based on a number of the N trial captures for which the maximum power is in the range.

Example 8 provides the apparatus according to any one of the preceding examples, where, for each of the K ranges, the each of the one or more captures to be used for the each of the K ranges for updating the model is the capture of the plurality of non-trial captures, and the power-specific capture selector circuit is further configured, for each of the K ranges, acquire non-trial captures until the one or more captures having a maximum power in the range are identified.

Example 9 provides the apparatus according to any one of the preceding examples, where updating the model includes, for each of the K ranges, forming or updating a power range model based on the one or more captures of the feedback signal in the range, and further includes aggregating the power range model for each of the K ranges into the model.

Example 10 provides the apparatus according to any one of the preceding examples, where N is an integer equal to or greater than 25, e.g., an integer equal to or greater than 50, an integer equal to or greater than 75, or an integer equal to or greater than 100.

Example 11 provides the apparatus according to any one of the preceding examples, where L is an integer equal to or greater than 500, e.g., an integer equal to or greater than 1000, an integer equal to or greater than 2000, or an integer equal to or greater than 4000.

Example 12 provides the apparatus according to any one of the preceding examples, where K is an integer equal to or greater than 3, e.g., an integer equal to or greater than 4.

Example 13 provides the apparatus according to any one of the preceding examples, where, for each capture of the trial or non-trial captures, the samples of the feedback signal in the capture are consecutive samples.

Example 14 provides the apparatus according to any one of the preceding examples, where, for each capture of the trial or non-trial captures, the samples of the feedback signal in the capture are from a portion of the feedback signal that is different from portions of the feedback signal for other captures.

Example 15 provides the apparatus according to any one of the preceding examples, where the nonlinear electronic component is a power amplifier.

Example 16 provides a communication system for receiving and transmitting radio frequency (RF) signals. The system includes a power amplifier configured to output an RF signal to be transmitted, a receiver configured to receive a feedback signal indicative of at least a portion of the RF signal output by the power amplifier, and a DPD circuit. The DPD circuit is configured to acquire N trial captures of samples of the feedback signal, where each trial capture includes L consecutive samples of the feedback signal, establish boundaries of K ranges of powers based on signal statistics of the N trial captures, where one of the K ranges includes a highest value of a maximum power among the N trial captures, and one of the K ranges includes a lowest value of the maximum power among the N trial captures, and where each of K, N, and L is an integer equal to or greater than 2, update a model of the power amplifier based on one or more captures of the feedback signal in each of the K ranges, where each of the one or more captures is either a capture of the N trial captures or a capture of a plurality of non-trial captures, where each non-trial capture includes M consecutive samples of the feedback signal, where M is an integer equal to or greater than 2, and apply a predistortion to at least a portion of an input signal prior to providing the input signal to the power amplifier, where the applied predistortion is based on the model.

Example 17 provides the communication system according to example 16, where the signal statistics of the N trial captures include a value of the maximum power determined for each of the N trial captures.

Example 18 provides the communication system according to examples 16 or 17, further including a transmitter configured to upconvert an output of the DPD circuit to generate an upconverted input signal with the predistortion applied thereto, and to provide the upconverted input signal to the power amplifier.

Example 19 provides the communication system according to any one of examples 16-18, where the DPD circuit includes a DPD actuator, an adaptation circuit, and a power-specific capture selector as described herein.

Example 20 provides the communication system according to any one of examples 16-19, where the DPD circuit is an apparatus according to any one of examples 1-15.

Example 21 provides a computer-implemented method of digital predistortion. The method includes establishing, by a power-specific capture selector circuit, boundaries of K ranges of powers in a feedback signal indicative of (e.g., including, or being based on) an output of a nonlinear electronic component by acquiring N trial captures of samples of the feedback signal, where each trial capture includes L consecutive samples of the feedback signal, and where each of K, N, and L is an integer equal to or greater than 2, for each of the N captures, determining a maximum power, and establishing the boundaries of the K ranges of powers based on the maximum powers determined for the N trial captures, where one of the K ranges includes a highest value of the maximum powers determined for the N trial captures, and one of the K ranges includes a lowest value of the maximum powers determined for the N trial captures. The method also includes updating, by an adaptation circuit, a model of the nonlinear electronic component based on one or more captures of the feedback signal in each of the K ranges, where each of the one or more captures is either a capture of the N trial captures or a capture of a plurality of non-trial captures, where each non-trial capture includes M consecutive samples of the feedback signal, where M is an integer equal to or greater than 2. The method further includes applying, by a DPD actuator circuit, a predistortion to at least a portion of an input signal prior to providing the input signal to the nonlinear electronic component, where the predistortion is based on the model.

Example 22 provides the method according to example 21, where K is an integer equal to or greater than 3, and at least one of the K ranges, different from the one of the K ranges that includes the highest value of the maximum powers determined for the N trial captures and different from the one of the K ranges that includes the lowest value of the maximum powers determined for the N trial captures, includes a power that is between 25 and 75 percent of the highest value of the maximum powers determined for the N trial captures.

Example 23 provides the method according to examples 21 or 22, where the boundaries of the K ranges of powers are established further based on a histogram of the maximum powers determined for the N trial captures.

Example 24 provides the method according to any one of examples 21-23, where the K ranges of powers are distributed nonlinearly.

Example 25 provides the method according to any one of examples 21-23, where K−2 ranges of powers are distributed uniformly between the one of the K ranges that includes the lowest value of the maximum powers determined for the N trial captures and the one of the K ranges that includes the highest value of the maximum powers determined for the N trial captures.

Example 26 provides the method according to any one of examples 21-23, where K−1 ranges of powers are distributed uniformly between zero and the one of the K ranges that includes the highest value of the maximum powers determined for the N trial captures.

Example 27 provides the method according to any one of examples 21-26, further including, for each range of the K ranges, determining a number of the one or more captures to be used for the range for updating the model, where the number is based on a number of the N trial captures for which the maximum power is in the range.

Example 28 provides the method according to any one of examples 21-27, where, for each of the K ranges, the each of the one or more captures to be used for the each of the K ranges for updating the model is the capture of the plurality of non-trial captures. In such an example, the method further includes, for each of the K ranges, acquiring non-trial captures until the one or more captures having a maximum power in the range are identified.

Example 29 provides the method according to any one of examples 21-28, where updating the model includes, for each of the K ranges, forming or updating a power range model based on the one or more captures of the feedback signal in the range, and aggregating the power range model for each of the K ranges into the model.

Example 30 provides the method according to any one of examples 21-29, where N is an integer equal to or greater than 25, e.g., an integer equal to or greater than 50, an integer equal to or greater than 75, or an integer equal to or greater than 100.

Example 31 provides the method according to any one of examples 21-30, where L is an integer equal to or greater than 500, e.g., an integer equal to or greater than 1000, an integer equal to or greater than 2000, or an integer equal to or greater than 4000.

Example 32 provides the method according to any one of examples 21-31, where K is an integer equal to or greater than 3, e.g., an integer equal to or greater than 4.

Example 33 provides the method according to any one of examples 21-32, where, for each capture of the trial or non-trial captures, the samples of the feedback signal in the capture are consecutive samples.

Example 34 provides the method according to any one of examples 21-33, where, for each capture of the trial or non-trial captures, the samples of the feedback signal in the capture are from a portion of the feedback signal that is different from portions of the feedback signal for other captures.

Example 35 provides the method according to any one of examples 21-34, where the nonlinear electronic component is a power amplifier.

Example 36 provides a non-transitory computer-readable storage medium including instructions for execution which, when executed by a processor, are operable to perform operations according to the method of any one of the preceding examples, or operations to enable performing DPD with power-specific capture selection according to any one of the preceding examples. Thus, in some examples, the non-transitory computer-readable storage medium according to example X1 may further include instructions operable to perform operations performed by any parts of the communication system in accordance with any one of the preceding examples.

Variations and Implementations

Figure 5:
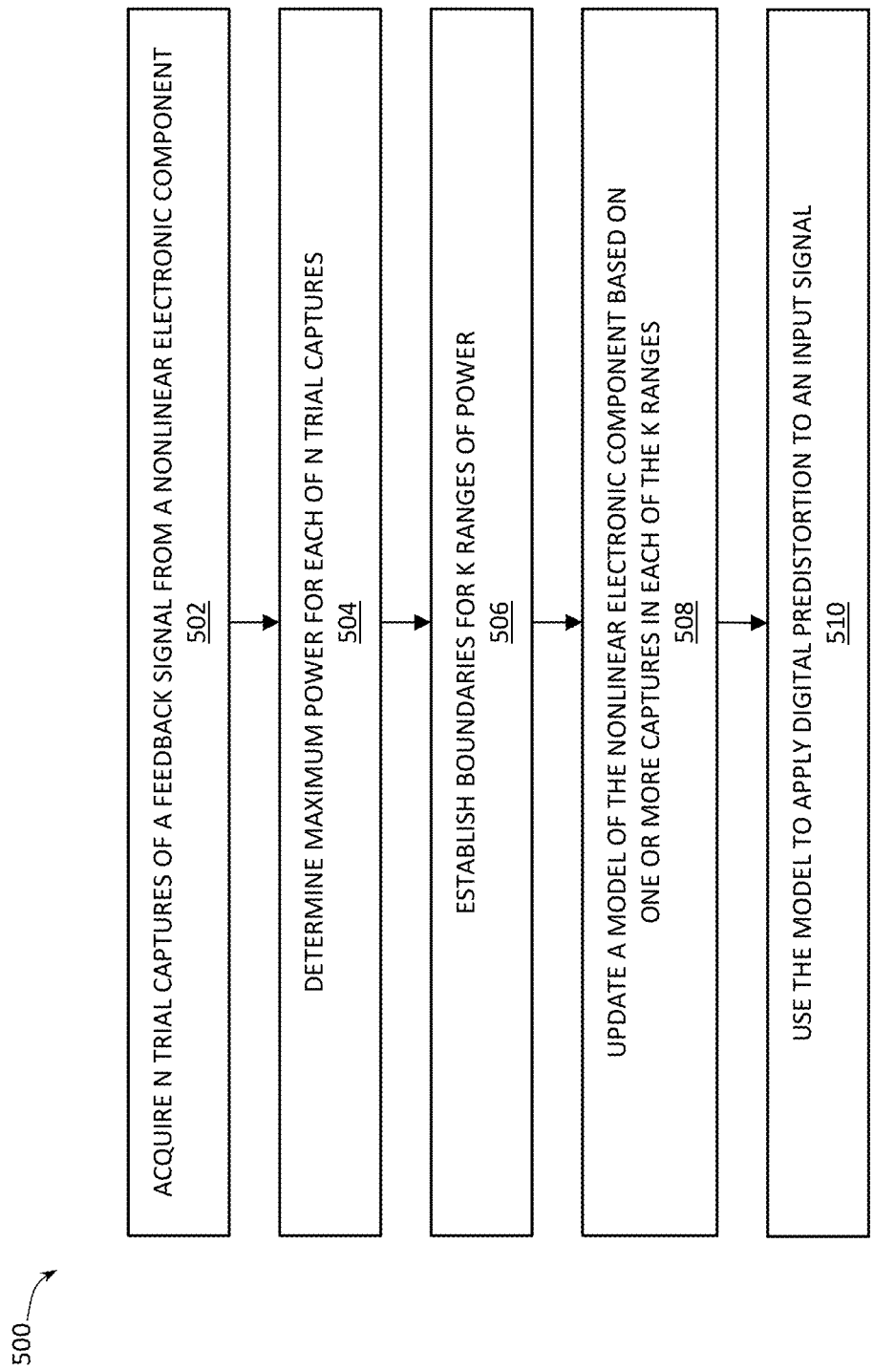
FIG. 5 provides a flow chart of a method for implementing DPD with power-specific capture selection, according to some embodiments of the present disclosure.

While embodiments of the present disclosure were described above with references to exemplary implementations as shown in FIGS. 4, 5, and 7, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as filters, converters, mixers, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to DPD with power-specific capture selection in various communication systems.

Parts of various systems for implementing DPD with power-specific capture selection as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the communication system shown in FIG. 4) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

It is also important to note that the functions related to DPD with power-specific capture selection as proposed herein illustrate only some of the possible functions that may be executed by, or within, communication systems. Some of these operations may be deleted or removed where appropriate, or these operations may be modified or changed considerably without departing from the scope of the present disclosure. Substantial flexibility is provided by embodiments described herein in that any suitable arrangements, chronologies, configurations, and timing mechanisms may be provided without departing from the teachings of the present disclosure.

The invention claimed is:

1. An apparatus for applying predistortion to an input signal, the apparatus comprising:
a capture selector circuit configured to establish boundaries of K ranges of powers in a feedback signal indicative of an output of an electronic component by:
acquiring N trial captures of the feedback signal, where each trial capture includes L samples of the feedback signal, and where each of K, N, and L is an integer equal to or greater than 2,
for each of the N trial captures, determining a power characteristic, and
establishing the boundaries of the K ranges of powers based on the power characteristics determined for the N trial captures, where one of the K ranges includes a highest value of the power characteristics determined for the N trial captures, and one of the K ranges includes a lowest value of the power characteristics determined for the N trial captures; and
an actuator circuit configured to apply a predistortion to at least a portion of the input signal prior to providing the input signal to the electronic component, where the predistortion is based on the boundaries of the K ranges of powers.

2. The apparatus according to claim 1, wherein K is an integer equal to or greater than 3, and at least one of the K ranges, different from the one of the K ranges that includes the highest value of the power characteristics determined for the N trial captures and different from the one of the K ranges that includes the lowest value of the power characteristics determined for the N trial captures, includes a power that is between 25 and 75 percent of the highest value of the power characteristics determined for the N trial captures.

3. The apparatus according to claim 1, wherein the boundaries of the K ranges of powers are established further based on a histogram of the power characteristics determined for the N trial captures.

4. The apparatus according to claim 1, wherein the K ranges of powers are distributed nonlinearly.

5. The apparatus according to claim 1, wherein K−2 ranges of powers are distributed uniformly between the one of the K ranges that includes the lowest value of the power characteristics determined for the N trial captures and the one of the K ranges that includes the highest value of the power characteristics determined for the N trial captures.

6. The apparatus according to claim 1, wherein K−1 ranges of powers are distributed uniformly between zero and the one of the K ranges that includes the highest value of the power characteristics determined for the N trial captures.

7. The apparatus according to claim 1, wherein N is an integer equal to or greater than 25.

8. The apparatus according to claim 1, wherein L is an integer equal to or greater than 500.

9. The apparatus according to claim 1, wherein K is an integer equal to or greater than 3.

10. The apparatus according to claim 1, wherein the electronic component is a power amplifier.

11. The apparatus according to claim 1, wherein the power characteristic is a maximum power.

12. The apparatus according to claim 1, wherein:
the apparatus further includes an adaptation circuit configured to update a model of the electronic component based on one or more captures of the feedback signal in each of the K ranges, where each of the one or more captures is either a capture of the N trial captures or a capture of a plurality of non-trial captures, where each non-trial capture includes M samples of the feedback signal, where M is an integer equal to or greater than 2; and
the predistortion is based on the boundaries of the K ranges of powers by being based on the model.

13. The apparatus according to claim 12, wherein the capture selector circuit is further configured to, for each range of the K ranges, determine a number of the one or more captures to be used for the range for updating the model, where the number is based on a number of the N trial captures for which the power characteristic is in the range.

14. The apparatus according to claim 12, wherein, for each of the K ranges, the each of the one or more captures to be used for the each of the K ranges for updating the model is the capture of the plurality of non-trial captures, and the capture selector circuit is further configured, for each of the K ranges, acquire non-trial captures until the one or more captures having a power characteristic in the range are identified.

15. The apparatus according to claim 12, wherein updating the model includes:
for each of the K ranges, forming or updating a power range model based on the one or more captures of the feedback signal in the range, and
aggregating the power range model for each of the K ranges into the model.

16. The apparatus according to claim 12, wherein, for each capture of the trial or non-trial captures, the samples of the feedback signal in the capture are consecutive samples.

17. The apparatus according to claim 12, wherein, for each capture of the trial or non-trial captures, the samples of the feedback signal in the capture are from a portion of the feedback signal that is different from portions of the feedback signal for other captures.

18. An apparatus for a radio frequency (RF) device, the apparatus comprising:
a digital predistortion (DPD) circuit, configured to:
establish boundaries of K ranges of powers based on signal statistics of a feedback signal indicative of at least a portion of an RF signal output by a power amplifier, where one of the K ranges includes a power characteristics of at least a portion of the feedback signal, and one of the K ranges includes a minimum power of the portion of the feedback signal, and where K is an integer equal to or greater than 2,
update a model of the power amplifier based on one or more captures of the feedback signal in each of the K ranges, where each of the one or more captures includes M samples of the feedback signal, where M is an integer equal to or greater than 2, and
apply a predistortion to at least a portion of an input signal prior to providing the input signal to the power amplifier, where the applied predistortion is based on the model.

19. The apparatus according to claim 18, wherein the signal statistics of the feedback signal include a value of the power characteristics determined for each digital sample of a plurality of digital samples of the portion of the feedback signal.

20. The apparatus according to claim 18, further comprising a transmitter circuit configured to upconvert an output of the DPD circuit to generate an upconverted input signal with the predistortion applied thereto, and to provide the upconverted input signal to the power amplifier.

21. A computer-implemented method of predistortion, the method comprising:
acquiring N trial captures of a feedback signal indicative of an output of an electronic component, where each trial capture includes L samples of the feedback signal, and where each of K, N, and L is an integer equal to or greater than 2;
for each of the N captures, determining a power characteristic, and
establishing the boundaries of the K ranges of powers based on the power characteristics determined for the N trial captures, where one of the K ranges includes a highest value of the power characteristics determined for the N trial captures, and one of the K ranges includes a lowest value of the power characteristics determined for the N trial captures;
updating a model of the electronic component based on one or more captures of the feedback signal in each of the K ranges, where each of the one or more captures is either a capture of the N trial captures or a capture of a plurality of non-trial captures, where each non-trial capture includes M samples of the feedback signal, where M is an integer equal to or greater than 2; and
applying a predistortion to at least a portion of an input signal prior to providing the input signal to the electronic component, where the predistortion is based on the model.

22. The method according to claim 21, wherein K is an integer equal to or greater than 3, and at least one of the K ranges, different from the one of the K ranges that includes the highest value of the power characteristics determined for the N trial captures and different from the one of the K ranges that includes the lowest value of the power characteristics determined for the N trial captures, includes a power that is between 25 and 75 percent of the highest value of the power characteristics determined for the N trial captures.

23. The apparatus according to claim 10, further comprising the power amplifier.

24. The apparatus according to claim 18, further comprising a receiver circuit, configured to receive the RF signal output by the power amplifier.

25. The apparatus according to claim 18, further comprising the power amplifier.

\* \* \* \* \*